United States Patent [19]
Paddock

[11] 4,264,747
[45] Apr. 28, 1981

[54] HIGH IMPACT STRENGTH STYRENE-ACRYLONITRILE RESIN BLEND

[75] Inventor: Charles F. Paddock, Southbury, Conn.

[73] Assignee: Uniroyal, Inc., New York, N.Y.

[21] Appl. No.: 168,872

[22] Filed: Jul. 14, 1980

[51] Int. Cl.³ .................. C08F 279/04; C08F 279/02; C08L 53/02
[52] U.S. Cl. ...................................... 525/86; 525/76; 525/78; 525/84; 525/98; 525/316
[58] Field of Search ...................... 525/71, 86, 98, 84, 525/78, 76

[56] References Cited

U.S. PATENT DOCUMENTS

| | | | |
|---|---|---|---|
| 3,489,821 | 1/1970 | Witt et al. | 525/75 |
| 4,126,600 | 11/1978 | Gergen | 260/42.18 |

*Primary Examiner*—Carman J. Seccuro
*Attorney, Agent, or Firm*—Anthony Lagani, Jr.

[57] ABSTRACT

High impact strength gum plastics are prepared by blending a styrene acrylonitrile resin with a styrene-ethylene-butylene-styrene block copolymer which has grafted on to it an acrylonitrile resin; preferably styrene acrylonitrile.

9 Claims, No Drawings

HIGH IMPACT STRENGTH STYRENE-ACRYLONITRILE RESIN BLEND

BACKGROUND OF THE INVENTION

It is well known that blends of elastomers containing polar groups such as acrylonitrile-butadiene copolymers (NBR) are not compatable with hydrocarbon rubbers such as ethylene-propylene rubbers. It is possible, however, to blend nitrile rubbers with certain polar resins such as styrene acrylonitrile; see for example U.S. Pat. No. 2,439,202. Blends of nitrile rubbers with acrylonitrile/butadiene/styrene resins (ABS) have been prepared; see for example Japanese Pat. No. S-7-5013369. These blends have also been prepared incorporating a third component such as polyvinylchloride (PVC); see for example U.S. Pat. No. 3,629,050.

Graft polymers of ethylene propylene terpolymers (EPDM) wherein the third monomer is a non-conjugated diene (EPDM) have been prepared wherein the graft polymer comprises styrene acrylonitrile resins (SAN). These grafts of SAN on an EPDM backbone are known as EPAS and are elastomeric in character when the resin side chain represents less than 60% by weight of the EPAS. EPAS has been successfully blended with SAN to prepare weather resistant, impact resistant resins; see for example U.S. Pat. Nos. 3,489,821 and 3,489,822.

SUMMARY OF THE INVENTION

It has surprisingly been found that when a styrene-ethylene-butylene-styrene block copolymer (SEBS) is grafted with SAN or other nitrile monomers or mixtures thereof these SEBS graft polymers exhibit good weather resistance as well as high impact strength. The graft preferably comprises a copolymer such as styrene-acrylonitrile rather than only the nitrile polymer.

DETAILED DESCRIPTION OF THE INVENTION

This invention relates to blends of styrene-acrylonitrile resin (SAN) with modified styrene-ethylene-butylene-styrene block copolymer (SEBS) rubbers. More particularly it relates to blends of SAN with a SEBS which has been made compatable with SAN by grafting a polar monomer onto the SEBS backbone.

The term "EPG" as used in the specification and claims means a SEBS polymer onto which has been grafted at least one polar monomer.

The term "polar monomer" as used in the specification and claims means olefinically polymerizable monomers which contain in their structure aromatic rings, carbonyl groups, nitrile moieties, ester groups, halides etc. Illustrative examples of polar monomers suitable for use in the practice of this invention include styrene; the halostyrenes e.g. parachlorostyrene; alpha-methylstyrene, p-methylstyrene, acrylonitrile, methacrylonitrile, acrylic acid methacrylic acid; $C_1$–$C_8$ lower alkyl esters of acrylic and methacrylic acid e.g. methyl acrylate, methylmethacrylate, vinyl chloride and the like. Combinations of these copolymerizable polar monomers may be used in the preparation of the EPG. A preferred combination is styrene and acrylonitrile resulting in an SAN graft onto the SEBS backbone. Illustrative of other such copolymerizable combinations are styrene-methylmethacrylate, styrene-methacrylic acid etc.

The EPG is formed by polymerizing at least one polar monomer in the presence of the SEBS with the result that a substantial part of the polymerized polar monomer resin is attached to the SEBS backbone. Any suitable method for preparing such graft copolymers may be used. In the course of preparing the EPG not all of the resin monomers will be grafted onto the backbone. The ungrafted polymer so formed is termed "free resin". Generally, the free resin has the same composition as the resin grafted to the SEBS. The term "graft resin" as used in the specification and claims means all the polymerized monomer mixture whether or not it was grafted onto the SEBS backbone. The proportion of polar monomer to SEBS used in the grafting reaction may vary over a wide range, depending upon factors such as the efficiency of grafting, i.e. the proportion of polymerized polar monomer actually attached to the SEBS, and the particular polar monomer in question. Though EPG polymers have been prepared wherein the graft resin comprises about 5% to about 90% by weight of the total EPG, for the purposes of this invention the graft resin comprises about 5% to about 90% by weight of the EPG; more preferably about 10% to about 70%; most preferably about 20% to about 60%.

It is desired to emphasize that the advantage of the instant invention is not obtainable simply by blending the described polar monomer resin with the ungrafted SEBS itself, which in general is not compatible with the resin. In the preparation of EPG, ungrafted SEBS will be present in the final product as well as free resin. Additionally, resin or polymer similar to the free resin and SEBS may be added to the EPG for use in this invention. The preferred EPG is a graft of stryene-acrylonitrile grafted onto an SEBS.

In addition to the SEBS and EPG the SAN compositions of this invention can include any of the conventional additives, fillers and curatives used in the preparation of SAN or SEBS compositions. These additional components include: fillers such as carbon black, calcium carbonate, magnesium oxide, etc.; curatives; stabilizers such as antioxidants; lubricants—both solid and liquid; extenders and rubber process oils.

The proportion of styrene-acrylonitrile resin to EPG in the blends of this invention is about 70/30 to about 20/80; preferably about 60/40 to about 25/75. It is also within the scope of this invention to include in the compositions minor amounts of a third compatible resin.

The compositions of this invention may be prepared by a conventional rubber blending methods such as the use of 2-roll mills or internal mixers such as Brabender, Banbury, Ko-Kneader, etc. The tests used to evaluate the compositions of this invention include Notched Izod at room temperature and −20° F. as well as Rockwell R hardness.

The SEBS utilized in this invention to prepare the EPG is made by the hydrogenation of styrene/butadiene block copolymers resulting from the anionic polymerization of styrene and butadiene using butyl lithium as a catalyst in a hydrocarbon solvent. During the polymerization the butadiene is incorporated into the polymer 80% in the 1,4 configuration and 20% in the 1,2 configuration so that upon hydrogenation the resulting rubber copolymer has a structure as though it were the product of the polymerization of styrene, ethylene and isobutylene. SEBS is available from Shell Chemical Co. and is sold under its Kraton trademark.

The advantage of this invention may be more readily appreciated by reference to the following Examples.

The compounds used throughout these Examples are described as follows:

Tinuvin P is 2(2'-hydroxy-5'-methylphenyl)-benzotriazole and manufactured by Ciba Geigy Chemical Co. The material is disclosed in U.S. Pat. No. 3,004,896.

Tinuvin 770 is a developmental light stabilizer and is a white to off-white crystalline powder having a melting range of 80°–86° C. It is believed that the material is bis(2,2,6,-tetramethyl-4-piperidyl) sebacate and disclosed in U.S. Pat. No. 3,640,928.

Unitane OR-450 is a titanium dioxide pigment manufactured by American Cyanamid Company.

Methocel K100 (trademark) is a hydroxypropyl methylcellulose, molecular weight 26,000.

Lupersol 11 (trademark) is 75% t-butylperoxypivalate in mineral spirits.

Irganox 1076 (trademark) is octadecyl beta (3,5-t-butyl-4-hydroxyphenyl) propionate.

Tyril 880 is a styrene/acrylonitrile resin containing about 28 weight percent of acrylonitrile and is marketed by Dow Chemical Co.

Kraton G 1650 is a SEBS having styrene/rubber ratio of 28/72 and a Brookfield Viscosity of 1500 as measured in a 20% toluene solution at 77° F.

Kraton G 1652 is a SEBS having a styrene/rubber ratio of 29/71 and a Brookfield Viscosity of 550 as measured in a 20% toluene solution at 77° F.

The EPG is prepared by charging a polymerization bottle with SEBS, water and Methocel. To this mixture is added a premixed blend of styrene, acrylonitrile, Irganox 1076 and Lupersol 11. After flushing with nitrogen the polymerization bottle is held at 40° C. in a water bath with agitation for one and one-half hours. The bottle is then transferred to a 90° C. bath and polymerization is continued with agitation for an additional 3 hours. The product is then water washed and dried.

EXAMPLE I

Preparation of EPG

EPG was prepared in the manner described above using the following recipes:

| Ingredient | EPG-1 Parts by weight | EPG-2 Parts by weight |
|---|---|---|
| Water | 186 | 186 |
| Kraton G-1650 | 46.5 | — |
| Kraton G-1652 | — | 46.5 |
| Styrene | 34.9 | 34.9 |
| Acrylonitrile | 18.6 | 18.6 |
| Irganox 1076 | 0.465 | 0.465 |
| Lupersol 11 | 1.4 | 1.4 |
| 2% Methocel K100 | 0.14 | 0.14 |
| Yield | 145.2 gm | 145.2 gm |

The product was lump free and had good stability and comprised 52 parts SAN and 48 parts SEBS.

EXAMPLE II

Comparison of SAN/SEBS Blends with SAN/EPG Blends

Blends of EPG with SAN resin were prepared and compared with SEBS/SAN. The blends were prepared in a Brabender in the following manner:

At zero minutes one-half of the SAN resin (Tyril 880) and one-half of the EPG is added to the Brabender followed by the addition of Tinuvin P, Tinuvin 770 and Unitane OR 450. The remainder of the SAN and EPG is then added to the Brabender. Mixing is continued for 10 minutes at 165° C. at a speed of 90 RPM. The blended composition was then compression molded into 2½"×5"×⅛" pads for testing. Notched Izod at room temperature at −20° F. and Rockwell R hardness were measured according to ASTM D-256-56 and ASTM D-785 respectively.

The results are shown in Table I. It will be noted that the Notched Izod test shows a substantial improvement when EPG is used as compared with SEBS. A comparison of runs 1–6 with 7–12 shows that the type of SEBS used to make the EPG will effect blend properties.

TABLE I

| SEBS AND EPG IN SAN | | | | | | |
|---|---|---|---|---|---|---|
| | 1 | 2 | 3 | 4 | 5 | 6 |
| Tyril 880 | 54 | 40 | 26 | 77.9 | 71.2 | 64.5 |
| EPG-1 | 46 | 60 | 74 | | | |
| Kraton 1650 | | | | 22.1 | 28.8 | 35.5 |
| Tinuvin P | .75 | .75 | .75 | .75 | .75 | .75 |
| Tinuvin 770 | .75 | .75 | .75 | .75 | .75 | .75 |
| Unitane OR 450 | 2 | 2 | 2 | 2 | 2 | 2 |
| Total Resin/SEBS | 77.9/ 22.1 | 71.2/ 28.8 | 64.5/ 35.5 | 77.9/ 22.1 | 71.2/ 28.8 | 64.5/ 35.5 |
| Notched Izod, RT | 1.1 | 2.5 | 15.7 | 0.3 | 0.3 | 0.3 |
| Notched Izod, −20° F. | 0.4 | 0.8 | 1.5 | 0.3 | 0.3 | 0.3 |
| Rockwell R | 104 | 94 | 87 | 106 | 97 | 87 |
| | 7 | 8 | 9 | 10 | 11 | 12 |
| Tyril 880 | 54 | 40 | 26 | 77.9 | 71.2 | 64.5 |
| EPG-2 | 46 | 60 | 74 | | | |
| Kraton 1652 | | | | 22.1 | 28.8 | 35.5 |
| Tinuvin P | .75 | .75 | .75 | .75 | .75 | .75 |
| Tinuvin 770 | .75 | .75 | .75 | .75 | .75 | .75 |
| Unitane OR 450 | 2 | 2 | 2 | 2 | 2 | 2 |
| Total Resin/SEBS | 77.9/ 22.1 | 71.2/ 28.8 | 64.5/ 35.5 | 77.9/ 22.1 | 71.2/ 28.8 | 64.5/ 35.5 |
| Notched Izod, RT | 0.8 | 4.2 | 7.2 | 0.3 | 0.4 | 0.4 |
| Notched Izod, −20° F. | 0.4 | 1.2 | 1.5 | 0.2 | 0.3 | 0.3 |
| Rockwell R | 102 | 93 | 68 | 103 | 95 | 82 |

What is claimed is:

1. A high impact resistant gum plastic composition comprising
   (A) a styrene-acrylonitrile resin (SAN); and
   (B) a graft polymer formed by graft polymerizing (a) at least one polar monomer onto (b) a styrene-ethylene-butylene-styrene block copolymer (SEBS); wherein the ratio of (A) to (B) is about 70/30 to about 20/80.

2. The composition of claim 1 wherein the ratio of (A) to (B) is about 60/40 to about 25/75.

3. The composition of claims 1 or 2 wherein the polar monomer is a mixture of styrene and acrylonitrile.

4. The composition of claim 1 wherein the graft polymer comprises about 5 to about 90% of polymerized polar monomer by weight based on the graft polymer.

5. The composition of claim 4 wherein the polar monomer is styrene, halostyrene, alpha-methyl styrene para methyl styrene, acrylonitrile, methacrylonitrile, acrylic acid, methylacrylic acid, vinylchloride, $C_1$-$C_8$ alkyl esters of acrylic acid and methacrylic acid or mixtures thereof.

6. The composition of claims 1 or 2 wherein the graft polymer is formed by graft polymerizing styrene and an olefinally unsaturated nitrile monomer in the presence of SEBS.

7. The composition of claim 6 wherein the nitrile monomer is acrylonitrile or methacrylonitrile.

8. The composition of claim 4 wherein the graft polymer comprises about 10 to about 70% by weight of polar monomer based on the graft polymer.

9. The composition of claim 8 wherein the graft polymer comprises about 20% to about 60% by weight of polar monomer based on the graft polymer.

* * * * *